(12) United States Patent
Xiong et al.

(10) Patent No.: US 9,632,973 B2
(45) Date of Patent: Apr. 25, 2017

(54) SUPPORTING RMA API OVER ACTIVE MESSAGE

(71) Applicant: Intel Corporation, Santa Clara, CA (US)

(72) Inventors: Jianxin Xiong, Sammamish, WA (US); Robert J. Woodruff, Banks, OR (US); Frank L. Berry, North Plains, OR (US)

(73) Assignee: Intel Corporation, Santa Clara, CA (US)

( * ) Notice: Subject to any disclaimer, the term of this patent is extended or adjusted under 35 U.S.C. 154(b) by 130 days.

(21) Appl. No.: 14/475,337

(22) Filed: Sep. 2, 2014

(65) Prior Publication Data

US 2016/0062944 A1     Mar. 3, 2016

(51) Int. Cl.
    *G06F 15/167*     (2006.01)
    *G06F 15/173*     (2006.01)
    *H04L 12/58*     (2006.01)

(52) U.S. Cl.
    CPC ........ *G06F 15/17331* (2013.01); *H04L 51/18* (2013.01)

(58) Field of Classification Search
    CPC ......... H04L 29/06; H04L 69/22; G06F 15/17; H04Q 11/0478
(Continued)

(56) References Cited

U.S. PATENT DOCUMENTS 5,448,698 A * 9/1995 Wilkes .................... G06F 15/17
370/412

5,790,804 A * 8/1998 Osborne ............ H04Q 11/0478
709/245
(Continued)

FOREIGN PATENT DOCUMENTS

JP     6-309252 A     11/1994
JP     08-241293 A     9/1996

OTHER PUBLICATIONS

Office Action received for Korean Patent Application No. 10-2015-0108653, mailed on Feb. 16, 2016, 3 pages of Korean Office Action only.
(Continued)

*Primary Examiner* — Dustin Nguyen
(74) *Attorney, Agent, or Firm* — Law Office of R. Alan Burnett, PS

(57) ABSTRACT

Methods, apparatus, and software for implementing RMA application programming interfaces (APIs) over Active Message (AM). AM write and AM read requests are sent from a local node to a remote node to write data to or read data from memory on the remote node using Remote Memory Access (RMA) techniques. The AM requests are handled by corresponding AM handlers, which automatically perform operations associated with the requests. For example, for AM write requests an AM write request handler may write data contained in an AM write request to a remote address space in memory on the remote node, or generate a corresponding RMA write request that is enqueued into an RMA queue used in accordance with a tagged message scheme. Similar operations are performed by AM read requests handlers. RMA reads and writes using AM are further facilitated through use of associated read, write, and RMA progress modules.

23 Claims, 5 Drawing Sheets

(58) Field of Classification Search
USPC .......................... 709/212, 230, 245; 370/412
See application file for complete search history.

(56) References Cited

U.S. PATENT DOCUMENTS

| | | | |
|---|---|---|---|
| 2005/0080869 A1* | 4/2005 | Bender ................... | H04L 29/06 709/212 |
| 2006/0069788 A1* | 3/2006 | Blackmore ............. | H04L 69/22 709/230 |
| 2009/0157996 A1 | 6/2009 | Arimilli et al. | |
| 2012/0023304 A1 | 1/2012 | Chan et al. | |

OTHER PUBLICATIONS

Office Action received for German Patent Application No. 102015112634.6, mailed on Jan. 21, 2016, 6 pages of German Office Action only.

Romanow, et al., "An Overview of RDMA over IP", In Proceedings of the First International Workshop on Protocols for Fast Long-Distance Networks, 2002, pp. 1-22.

Combined Search and Examination Report received for United Kingdom Patent Application No. 1513562.7, mailed on Feb. 26, 2016, 9 pages.

Office Action received for Japanese Patent Application No. 2015-148205, mailed on Aug. 30, 2016, 8 pages of Japanese Office Action including 4 pages of English Translation.

Office Action received for Korean Patent Application No. 10-2015-0108653, mailed on Aug. 31, 2016, 4 pages of Korean Office Action.

Office Action and Search Report received for Taiwan Patent Application No. 104124258, mailed on Aug. 29, 2016, 22 pages of Taiwan Office Action including 11 pages of English Translation.

Watanabe, et al., "Implementation and Evaluation of RHiNET-2 System:The Parallel and Distributed Processing Environment", Journal of the Institute of Electronics, Information and Communication Engineers, Japan, Incorporated Association—The Institute of Electronics, Information and Communication Engineers, Sep. 1, 2007, vol. J90-D, No. 9, pp. 2465-2482 (Total Pages 19).

* cited by examiner

SUPPORTING RMA API OVER ACTIVE MESSAGE

BACKGROUND INFORMATION

In a computer system with a distributed memory configuration (for example, a cluster), each computing node has direct access to its own attached local memory. The memory attached to other nodes is called remote memory. Usually remote memory is not directly accessible and message passing mechanisms are used to communicate between the nodes.

Remote Memory Access (RMA) refers to a software interface that gives the impression that the remote memory can be directly accessed. There are many forms of RMA operations, but ultimately they can be summarized as two: read and write. The read operation copies data from a remote memory address range into a local buffer. The write operation copies data from a local buffer into a remote memory address range.

Existing Remote Memory Access (RMA) implementations generally fall into two categories. The implementations corresponding to the first category make use of the Remote Direct Memory Access (RDMA) capability of the underlying interconnection fabrics between computer nodes Infini-Band (IB) Host Controller Adaptors (HCAs) such as those from Mellanox support RDMA functions in hardware. The capability is exposed to applications via a software interface called IB Verbs. With IB verbs, in order to perform an RMA operation, the user creates a work request and posts it to a work queue. The HCA then processes the queue and performs RDMA in hardware. The approach used by the second category is to emulate RMA functions over a regular message passing interface (MPI). An example is the implementation of one-sided operations in MPICH/MPICH2 (High-Performance MPI). This is often done in a request-reply fashion. Due to the asynchronous nature of the RMA operations, a separate thread is usually needed to ensure the requests get processed.

The existing RMA implementations have numerous drawbacks. Under RDMA-based implementations, specialized hardware is required. Under message passing-based implementations, additional traffic pertaining to associated messages must be transferred over the interconnect fabric, thus reducing the effective bandwidth of the fabric.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1A:
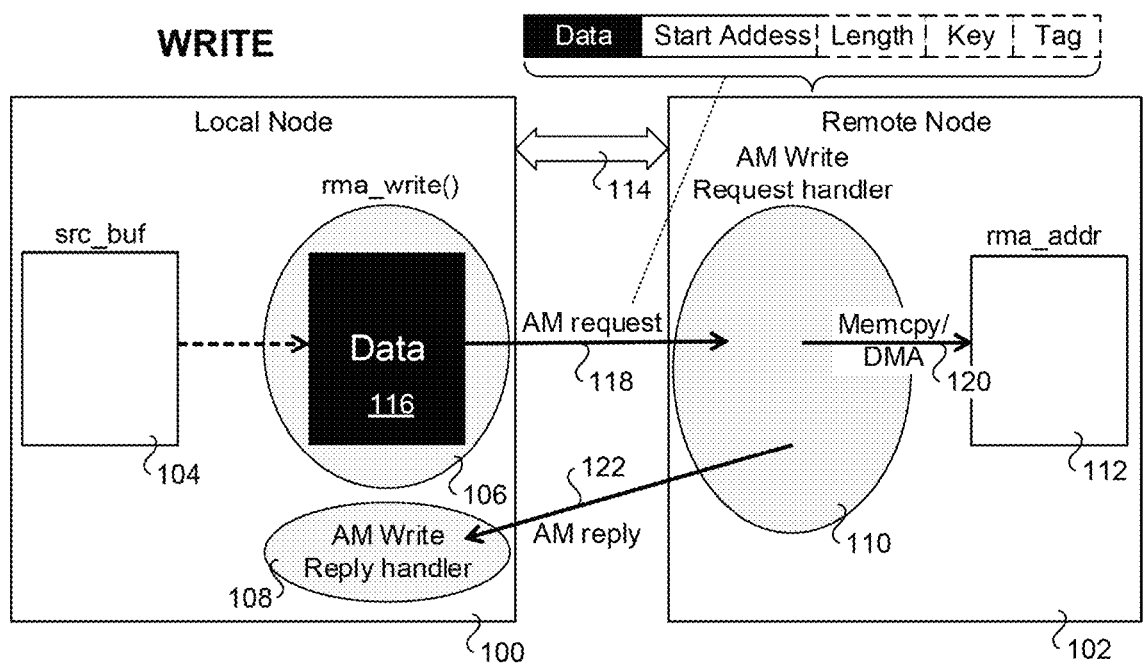
FIG. 1a is a schematic diagram illustrating an RMA write under which a block of data is written into the address space of a remote node through use of an AM write request handler, according to one embodiment.

Embodiments of methods, apparatus, and software for implementing an RMA application programming interfaces (APIs) over Active Message (AM) are described herein. In the following description, numerous specific details are set forth to provide a thorough understanding of embodiments disclosed and illustrated herein. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

Under aspects of the embodiments disclosed herein, Active Message techniques are implemented to facilitate RMA write and read operations under which data is written to or read from memory in a remote node using RMA. The basic idea of AM is to allow a piece of code to be executed automatically at the target side when a message arrives. This piece of code is called an AM handler. Multiple AM handlers can be pre-registered with the AM mechanism and an AM message can refer to any of them by specifying a corresponding identifier for the AM handler. An AM message can be either a request or a reply, both of which can carry data plus some extra control information and can cause the execution of the specified handler. An AM request can be issued anywhere except inside an AM handler;

while an AM reply can only be issued inside an AM handler, and at most one reply can be issued for each AM request.

Under aspects of the embodiments disclosed herein, Active Message handlers are executed automatically when a corresponding AM request or reply arrives at its target. This provides the necessary asynchronous processing mechanism needed for RMA operations. Basically, an RMA write operation can be implemented as an AM request that carries the data from the source buffer and an AM handler that copies the data to the target address. An RMA read operation can be implemented as an AM request that carries the target address information, an AM handler that sends the data back via an AM reply, and another AM handler that copies the data to the destination buffer.

Figure 1B:
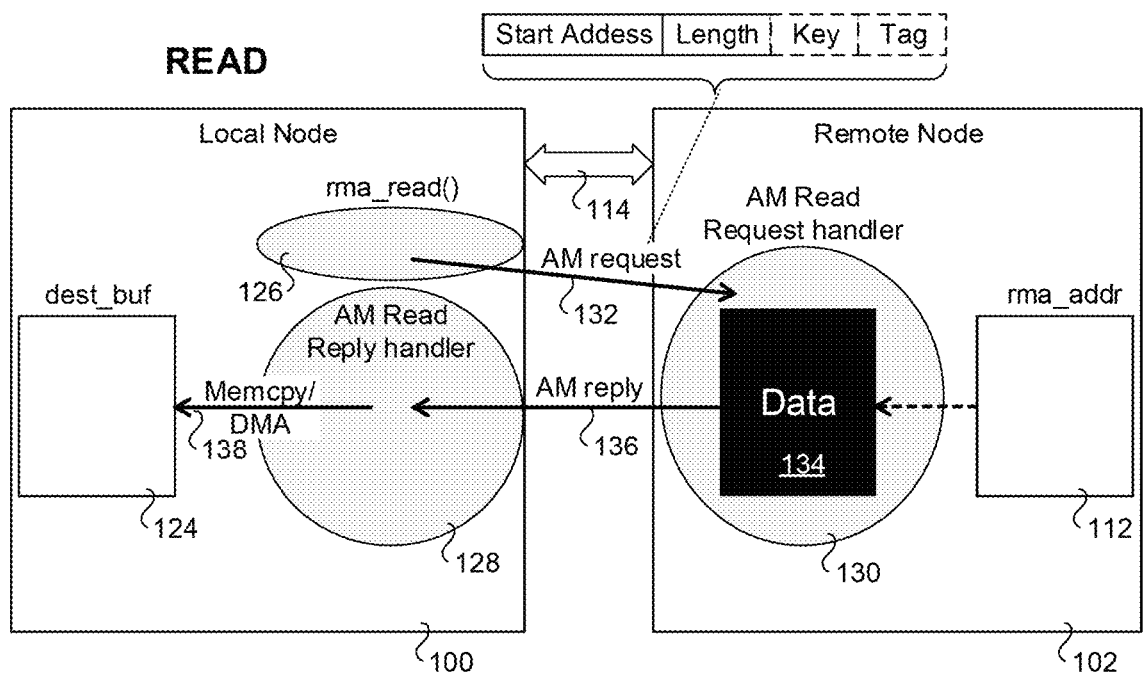
FIG. 1b is a schematic diagram illustrating an RMA read under which a block of data is read from the address space of a remote node through use of an AM read request handler and AM read reply handler, according to one embodiment.

FIGS. 1a and 1b illustrate write and read AM mechanisms for transferring blocks of data between a local node 100 and a remote node 102, according to one embodiment. As shown in FIG. 1a, local node 100 includes a source buffer (src_buf) 104, an RMA write (rma_write( )) module 106, and an AM write reply handler 108. Remote node 102 includes an AM write request handler 110, and an RMA address space 112. Local node 100 is communicatively coupled to remote node 102 via an interconnect 114.

An RMA write of a block of source data 116 from source buffer 104 to RMA address space 112 proceeds as follows. Source data 116 is read from source buffer 104 via RMA write module 106, which generates an AM write request 118 that is sent over interconnect 114 to AM handler 110. AM write request 118 includes source data 116, as well as information about the remote memory range to which source data 116 is to be written. This includes the starting address (rma_addr) in RMA address space 112 at which the start of data 116 is to be written, and may optionally include the size (length), an access key and/or a message tag. The AM write request handler at the target side (AM write request handler 110) then copies source data 116 into RMA address space 112 starting with address rma_addr via a DMA or memory copy operation 120. In one embodiment, when AM write request handler 110 has completed copying source data 116 to RMA address space 112, an optional AM write reply 122 may be sent back to the initiator (local node 100) if a completion event is desired. As illustrated, AM write reply 122 is directed to AM write reply handler 108, which is configured to handle the completion event.

FIG. 1b shows further resources and AMs employed by local node 100 and remote node 102 in connection with an RMA read operation. These include a destination buffer (dest_buf) 124, an RMA read (rma_read( )) module 126, and AM read reply handler 128 for local node 100, and an AM read request handler 130 for remote node 102. In one embodiment, AM write reply handler 108 and AM read reply handler 128 correspond to the same AM handler. Similarly, in one embodiment, AM write request handler 110 and AM read request handler 130 correspond to the same AM handler.

The operation of an RMA read operation proceeds as follows. RMA read API 126 sends an AM read request 132 to AM read request handler 130 identifying a remote address range beginning with rma_addr at which the data to be read (e.g., remote data 134) is stored. In one embodiment AM read request 132 includes the starting address (rma_addr), length, and may include an access key and/or message tag. In response to receiving AM read request 132, AM read request handler 130 sends a copy of remote data 134 from remote node 102 to local node 100 via an AM read reply 136 that is directed to AM read reply handler 128. Upon receipt of AM read reply 136, AM read reply handler 128 extracts the copy of remote data 134 and performs a DMA or memory copy 138 to write the copy of remote data 134 to destination buffer 124, completing the RMA read operation.

Generally, AM mechanisms may have limitations on the amount of data that can be transferred via a single AM message. To overcome such limitations, an amount of data greater than the limit for a single AM message may be divided into smaller data units (e.g., packets) and transferred in a pipelined fashion. Examples of RMA read and RMA write operations resulting in transfer of data between a local node 200 and remote node 202 over an interconnect 204 using this technique are illustrated in FIGS. 2a and 2b.

Figure 2A:
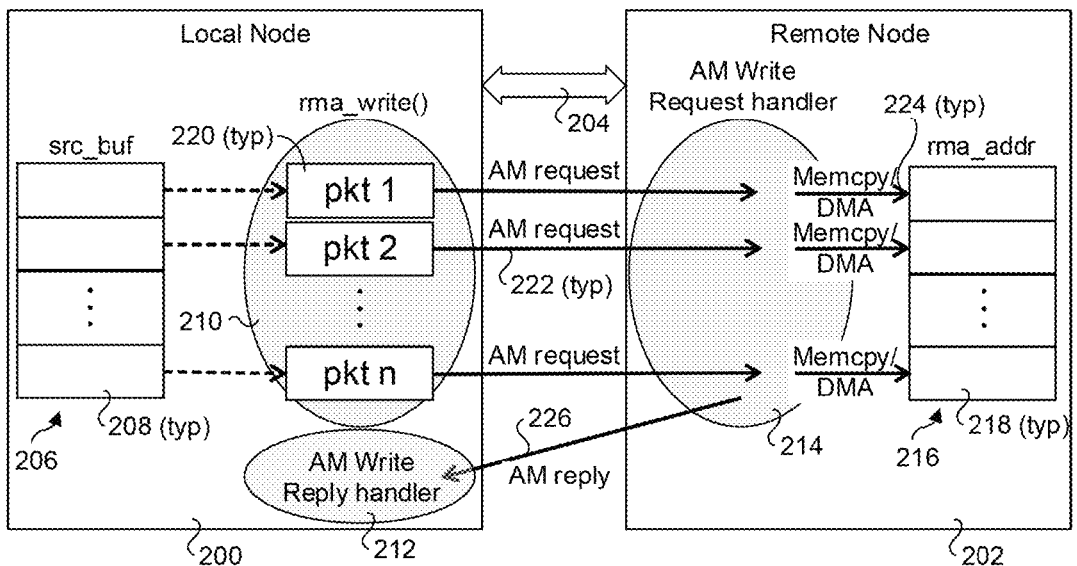
FIG. 2a is a schematic diagram illustrating an RMA writes implementation under which data is transferred via a plurality of packets using the scheme shown in FIG. 1a, according to one embodiment.
Figure 2B:
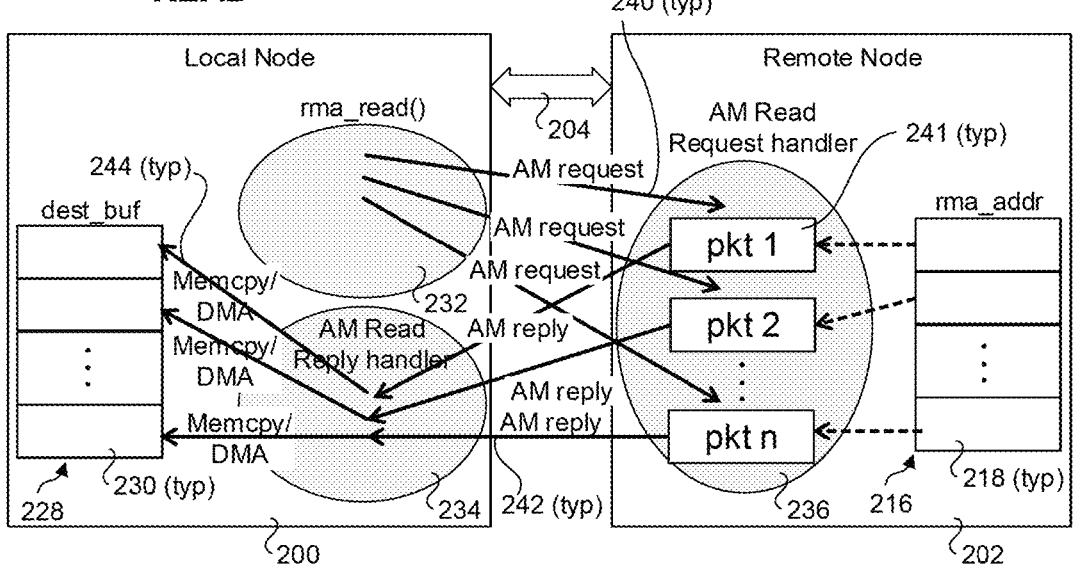
FIG. 2b is a schematic diagram illustrating an RMA read implementation under which data is transferred via a plurality of packets using the scheme shown in FIG. 1b, according to one embodiment.

As shown in FIG. 2a, local node 200 includes a source buffer 206 having multiple slots 208, an RMA write module 210, and an AM write reply handler 212. Remote node 202 includes an AM write request handler 214, and an RMA memory space 216 partitioned into multiple slots 218.

The pipelined RMA write proceeds as follows. Data stored in respective slots in source buffer 206 is accessed via RMA write module 210 and is transferred as a plurality of packets 220 via respective AM write requests 222. Similar to above, in one embodiment each AM write request 222 includes the starting address (rma_addr), and optional length, access key and/or message tag. Upon receipt by AM handler 214, each AM request 222 is processed, resulting in generation of respective memory copies 224 that write data into corresponding address ranges beginning at rma_addr in RMA address space 216. In embodiments employing completion events, one or more AM write replies 226 are returned to AM handler 212. For example, an AM write reply might be returned for each completed packet write, or an AM write reply may confirm completion of multiple packet writes, such as providing a single AM write reply 226 for a given source data transfer, regardless of the number of packets sent.

For illustrative purposes, the portion of source data for each packet 220 is depicted as being stored in a respective slot 208 in source buffer 206 and written to a respective slot 218 in RMA address space 216; however, it will be recognized that source buffer 206 and/or RMA address space 216 do not need to be partitioned into multiple slots, but may generally be configured as one or more address spaces in which data may be stored. In addition, the size of each packet 220 may be the same, or different sizes may be used. For example, in one embodiment packets employ a maximum transfer unit (MTU) applicable to the underlying transport protocol used by interconnect 204 is used (noting the last packet may have a size less than the MTU). At the same time, the data contained in the packets should be written to RMA address space 216 in a manner that replicates the block of source data that is to be transferred via multiple packets. In one embodiment, the packet data is written in order, while in other embodiments out-of-order writes are permitted so long upon completion the written data block comprises a replication of the source data block.

As shown in FIG. 2b, local node 200 further includes a destination buffer 228 having multiple slots 230, an RMA read module 232, and an AM read reply handler 234. Remote node 202 further includes an AM read request handler 236. As with the multi-packet RMA write, data is transferred via RMA read module 232 using multiple packets. Each packet transfer is similar to the data block transfer for the RMA read of FIG. 1b, and proceeds as follows. RMA read module 232 sends an AM read request 240 targeted to be handled by AM read request handler 236. Each AM read request 240 identifies a remote address range beginning with rma_addr at which the remote data to be read is stored. Similar to above, in one embodiment AM read request 240 includes the starting address (rma_addr), length, and an optional access key and/or message tag.

In response to receiving each AM read request 240, AM read request handler 236 sends a copy of a portion of remote data comprising a packet 241 from remote node 202 to local node 200 via an AM read reply 242 that is directed to AM read reply handler 234. Upon receipt of each AM read reply 242, AM read reply handler 234 extracts the copy of remote data in packet 241 and performs a DMA or memory copy 244 to write the copy of remote data transferred via packet 241 to a corresponding slot 230 in destination buffer 228, completing the RMA read operation for the packet. As with the multi-packet read operation depicted in FIG. 2a and discussed above, the use of slots for destination buffer 228 and RMA address space 216 are for illustrative purposes, as the size of packets may vary in some embodiments.

The packet size can be a limiting factor of the maximum bandwidth achievable via a pipelined implementation. However, additional performance enhancement for large data transfers can be achieved by utilizing a tagged message-passing mechanism if such a mechanism is available. Tagged message passing is similar to regular message passing in the respect that they both are performed as sending at one side and receiving at the other side. Tagged message passing, however, also attaches a tag to each message so that the receiver can choose which message to receive. This effectively turns a single communication channel into multiple channels. In one embodiment, the tag is used to identify different RMA operations in order to ensure the one-to-one matching between the paired send and receive operations.

Figure 3A:
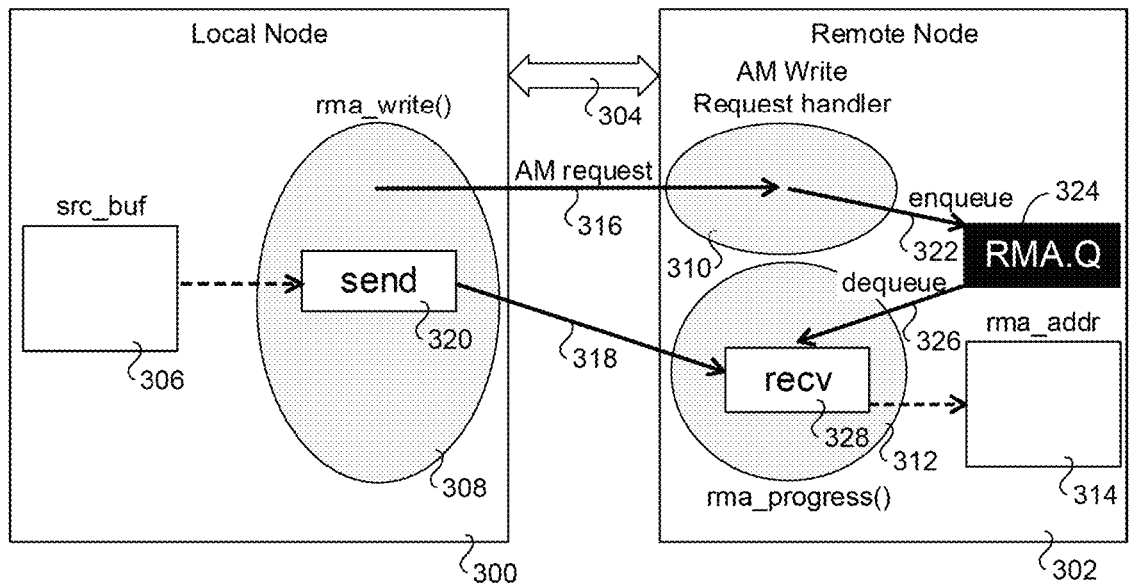
FIG. 3a is a is a schematic diagram illustrating a tagged message RMA write under which a block of data is written into the address space of a remote node through use of an AM request followed by a send operation, according to one embodiment.
Figure 3B:
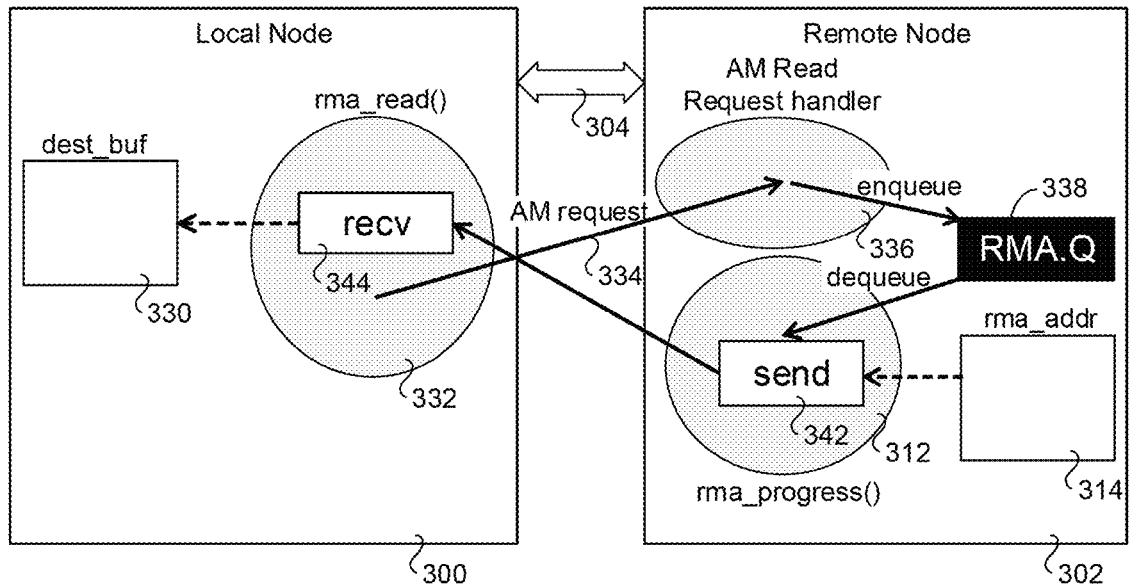
FIG. 3b is a is a schematic diagram illustrating a tagged message RMA read under which a block of data is read from the address space of a remote node through use of an AM read request handler, an RMA progress module, and an RMA read module, according to one embodiment.

Examples of read and write operations using tagged messages are illustrated in FIGS. 3a and 3b. As shown in the tagged message write operation of FIG. 3a, a block of source data is transferred from a local node 300 to a remote node 302 via an interconnect 304. In further detail, local node 300 includes a source buffer 306 in which the source data is stored, and an RMA write module 308, while remote node 302 includes an AM write request handler 310, an RMA progress module 312, and an RMA address space 314.

The tagged message write operation proceeds as follows. The RMA write comprises an AM write request 316 followed by a send operation 318. AM write request 316 carries only the information about the remote address range, without any data payload; rather, the send data 320 is transferred via the subsequent send operation 318. Upon receipt of AM write request 316, AM handler 310 generates a corresponding RMA write request and places the RMA write request via an enqueue operation 322 into an RMA queue 324. When the enqueued RMA write request is subsequently processed by RMA progress module 312 following a dequeue operation 326, a receive operation 328 is issued with the remote address range provided by AM write request 316 as the receive buffer in RMA address space 314. This receive operation should match with send 320 posted at the initiator side (i.e., local node 300) and get the source data into the intended remote address range in RMA address space 314. Generally, sending AM write requests and sends of corresponding data may be asynchronous, although preferably the AM write request should precede its associated data send. In one embodiment, receive operation 328 may temporarily buffer blocks of send data 320 prior to being written to RMA address space 314.

As shown in FIG. 3b, local node 300 further includes a destination buffer 330 and an RMA read module 332, which are configured to facilitate a tagged message read operation as follows. As with the tagged message write operation, an RMA read consists of a receive operation followed by an AM read request and the AM read request handler will cause a send operation being issued at the target side. The RMA queue at the target side is needed because usually message passing operations cannot be issued inside an AM handler.

As illustrated in FIG. 3b, RMA read module 332 issues an AM read request 334 that is directed to and received by an AM read request handler 336 on remote node 302. AM read requests handler 336 generates a corresponding RMA read request and enqueues the read request in an RMA read request queue 338, while a send block 340 in RMA progress module 312 dequeues read requests from RMA read request queue 338, retrieves corresponding data from RMA address space 314, and sends the data via a send operation 342 to a receive operation 344 in RMA read module 332. Receive operation 344 then writes the data into destination buffer 330, completing the remote read operation.

Depending on the particular approach used, memory address space(s) to be used for RMA write and read operations in accordance with the foregoing embodiments may or may not require registration in advance. For example, some embodiments employ PSM (Performance Scaled Messaging), which doesn't need memory registration. PSM defines an API designed specifically for HPC. It defines a tagged messaging API that handles high level capabilities and can efficiently support the implementation of the Message Passing Interface (MPI) standard. In the meantime, the PSM's internal implementation can focus on interconnect specific details relating to data movement strategies and tuning and advanced feature such as QoS (Quality of Service), dispersive routine, resiliency, etc. Active Message is also provided as an experimental feature.

PSM is designed to be implemented as a user space library. Details for performing RMA data transfers using PSM are provided in versions of the PSM Programmer's Manual, published by QLogic, the developer of PSM, or in various PSM-related documents published by the OpenFabrics Alliance. PSM is included in OFED (OpenFabrics Enterprise Distribution) as of version 1.5.2, and is a peer to IB Verbs. Although targeted for use in InfiniBand, under embodiments employing PSM herein, PSM-like functionality may be implemented for non-InfiniBand hardware, such as Ethernet Network adaptors.

As mentioned above, PSM doesn't need memory registration. Optionally, a lightweight memory registration mechanism may be implemented to provide access validation. The implementation considerations may include the memory region control structure to be accessed, such as a contiguous address space or a sorted disjoint list of address ranges. In one embodiment, the control structure address may be used as the access key.

Figure 4:
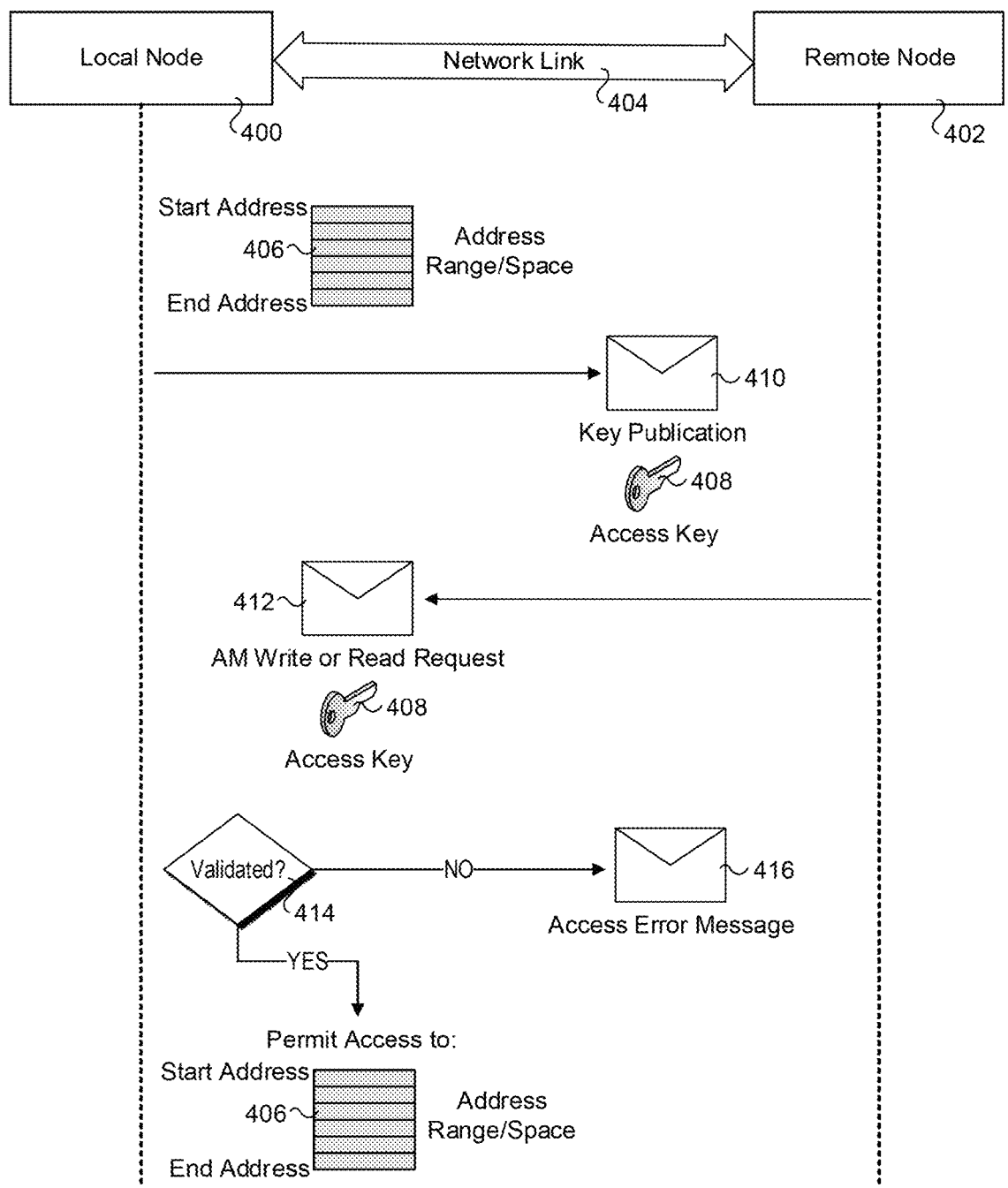
FIG. 4 is a time-flow diagram illustrating an exchange of messages between a local node and remote node correspond to a access key exchange and a memory registration operation.

FIG. 4 illustrates an operation and messaging timeflow performed by a local node 400 and a remote node 402 connected via a network link 404. Although depicted as a direct connection, it will be understood that network link 404 may traverse one or more additional network elements, such as a switch or the like. The timeflow begins with local node 400 registering one or more address ranges 406 within one or more address spaces in local node 400's local memory. Local node 400 then publishes access keys 408 via key publication messages 410 that are sent to one or more remote nodes, such as remote node 402. In one embodiment, access key 408 is encoded to identify the registered address range(s)/space(s) registered by local node 400.

Subsequently, access key 408 is used for the validation of RMA write and RMA read requests issued by remote node 402 to access memory within the address range(s)/space(s) registered by local node 400. As depicted in the lower portion of FIG. 4, a message 412 corresponding to an AM write request or AM read request is sent from remote node 402 to local node 400. Message 412 includes access key 408. Upon receipt, the AM write or AM read is validated by local node 400 using access key 408. This validation operation may also validate the address range specified by the starting address and the explicit or detected size of the request to verify it is when the registered address range(s)/space(s). If validation is successful, access to the registered memory is permitted; otherwise it is not. In one embodiment, an access error message 416 is returned to remote node 402 if its AM write or AM read request fails validation.

Figure 5:
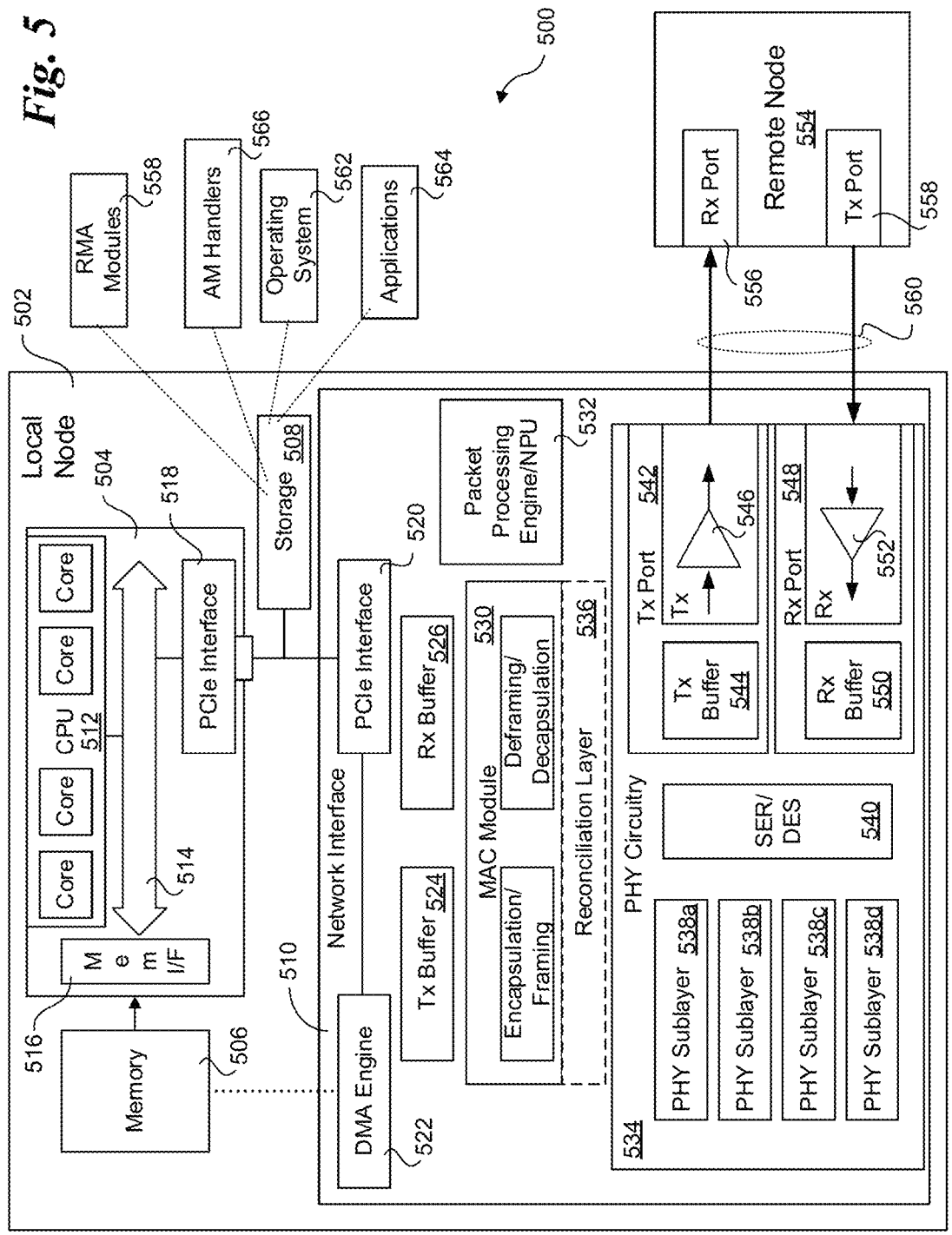
FIG. 5 is a block schematic diagram of an node architecture configured to facilitate aspects of local and remote node operations in accordance with embodiments disclosed herein.

FIG. 5 is a block schematic diagram of an exemplary apparatus configured to be implemented as a (local) node 500 that may be used to implement aspects of the embodiments disclosed herein. (It shall be recognized that the context of "local" or "remote" node is from the viewpoint of the node, and the operations and functionalities described herein may be implemented by a single node operating as either a local node or remote node in the context of the RMA write or read operations.) In one embodiment, node 500 comprises a server blade or server module configured to be installed in a server chassis. The server blade/module includes a main board 502 on which various components are mounted, including a processor 504, memory 506, storage 508, and a network interface 510. Main board 502 will generally include one or more connectors for receiving power from the server chassis and for communicating with other components in the chassis. For example, a common blade server or module architecture employs a backplane or the like including multiple connectors in which mating connectors of respective server blades or modules are installed.

Processor 504 includes a CPU 512 including one or more cores. The CPU and/or cores are coupled to an interconnect 514, which is illustrative of one or more interconnects implemented in the processor (and for simplicity is shown as a single interconnect). Interconnect 514 is also coupled to a memory interface (I/F) 516 and a PCIe (Peripheral Component Interconnect Express) interface 518. Memory interface 516 is coupled to memory 506, while PCIe interface 518 provides an interface for coupling processor 504 to various Input/Output (I/O) devices, including storage 508 and network interface 510. Generally, storage 508 is illustrative of one or more non-volatile storage devices such as but not limited to a magnetic or optical disk drive, a solid state drive (SSD), a flash memory chip or module, etc.

Network interface 510 is illustrative of various types of network interfaces that might be implemented in a server node, such as an Ethernet network adaptor or NIC. Network interface 510 includes a PCIe interface 520, a Direct Memory Access (DMA) engine 522, a transmit buffer 524, a receive buffer 526, a MAC module 530, and a packet processing engine or NPU (Network Processor Unit) 532. Network interface 510 further includes PHY circuitry 534 comprising circuitry and logic for implementing an Ethernet physical layer. Also depicted is an optional reconciliation layer 536.

PHY circuitry 534 includes a set of PHY sublayers 538a-d, a serializer/deserializer (SERDES) 540, a transmit port 542 including a transmit buffer 544 and one or more transmitters 546, and a receive port 548 including a receive buffer 550 and one or more receivers 552. Node 500 is further illustrated as being linked in communication with a remote node 554 including a receive port 556 and a transmit port 558 via a wired or optical link 560. Depending on the particular Ethernet PHY that is implemented, different combinations of PHY sublayers may employed, as well as different transmitter and receiver configurations. For example, a 10GE PHY will employ different PHY circuitry that a 40GE or a 100GE PHY.

Various software components are executed on one or more cores of CPU 512 to implement software-based aspects of the embodiments, such as described above with reference to FIGS. 1a, 1b, 2a, 2b, 3a, and 3b. Exemplary software components depicted in FIG. 5 include a host operating system 562, applications 564, and software instructions for implementing various AM handlers 566 and RMA modules 568. All or a portion of the software components generally will be stored on-board the node, as depicted by storage 508. In addition, under some embodiments one or more of the components may be downloaded over a network and loaded into memory 506 and/or storage 508.

During operation of node 500, portions of host operating system 562 will be loaded in memory 506, along with one or applications 564 that are executed in OS user space. AM handlers 566 and RMA modules 558 generally may be implemented using an OS driver or the like, or may be implemented as a software component executed in OS user space. In some embodiments, all or a portion of AM handlers 566 and/or RMA modules 558 may be implemented as embedded software that is executed on one or more processing elements implemented in network interface 510, such as packet processing engine/NPU 532. As another option, all or a portion of AM handler operations and/or RMA module operations may be implemented via one or more virtual machines hosted on node 502 (not shown).

In the embodiment illustrated in FIG. 5, MAC module 530 is depicted as part of network interface 510, which comprises a hardware component. Logic for implementing various operations supported by network interface 510 may be implemented via embedded logic and/or embedded software running on packet processing engine/NPU 532 or one or more other processor elements. As an example, embedded logic may be employed for preparing upper layer packets for transfer outbound from transmit port 542. This includes encapsulation of upper layer packets (e.g., TCP/IP, UDP, other protocols, etc.) in Ethernet packets, and then framing of the Ethernet packets, wherein Ethernet packets are used to generate a stream of Ethernet frames.

Generally, packet processing operations performed by packet processing engine/NPU 532 may be implemented via embedded logic and/or embedded software. Packet processing is implemented to manage forwarding of data within network interface 510 and also between network interface 510 and memory 506. This includes use of DMA engine 522 which is configured to forward data from receive buffer 526 to memory 506 using DMA writes, resulting in data being forwarded via PCIe interfaces 520 and 518 to memory 506 in a manner that doesn't involve CPU 512. In some embodiments, transmit buffer 524 and receive buffer 526 comprises Memory-Mapped IO (MMIO) address space that is configured to facilitate DMA data transfers between these buffers and memory 506 using techniques well-known in the networking art.

None, all, or a portion of the MAC layer operations may be implemented in software running on host processor 504. In one embodiment using a split-MAC architecture, Ethernet packet encapsulation and decapsulation operations are implemented in software, while Ethernet framing and deframing is implemented via hardware (e.g., via embedded logic or embedded software running on packet processing engine/NPU 532 on network interface 510).

The RMA write and RMA schemes employing AM requests, AM replies, and associated AM handlers provides advantageous over existing RMA techniques. For example, since these schemes may be implemented via software executing on a host, RMA data transfers that previously required specially-configured hardware (e.g., InfiniBand HCAs) may be extended to use with other protocols, such as but not limited to Ethernet. The schemes may be combined with existing techniques, such as use of PSM or tagged messaging APIs to further enhance functionality and performance.

Further aspects of the subject matter described herein are set out in the following numbered clauses:

1. A method for performing Remote Memory Access (RMA) data transfers between a remote node and a local node, the method comprising:

performing an RMA write under which data is written from the local node to the remote node by, reading data to be written from a source buffer on the local node;

sending a first Active Message (AM) write request from the local node to an AM handler on the remote node, the first AM write request containing data to be written and a starting address in a remote memory address space on the remote node at which the data is to be written; and handling the first AM write request with the AM handler on the remote node by extracting the data from the first AM write request and writing the data into an address range in the remote memory address space beginning at the starting address.

2. The method of clause 1, further comprising:

sending an AM write reply from the remote to the local node, the AM write reply indicating the data has been successfully written into the remote memory address space; and employing an AM handler on the local node to process the AM write reply message.

3. The method of clause 1 or 2, further comprising:

partitioning the data to be written into a plurality of packets;

for each of the plurality of packets, reading packet data corresponding to that packet from the source buffer on the local node;

sending a respective AM request from the local node to the AM handler on the remote node containing the packet data and a starting address in a remote memory address space on the remote node at which the packet data is to be written; and handling the respective AM request with the AM handler on the remote node by extracting the packet data from the respective AM request and writing the data into an address range in the remote memory address space beginning at the starting address, wherein the first AM write request corresponds to an AM write request used to transfer a first packet of data of the plurality of packets.

4. The method of clause 3, further comprising:

detecting that all of the packet data has been successfully written to the remote memory address space;

sending an AM reply from the remote to the local node indicating the packet data has been successfully written into the remote memory address space; and employing an AM handler on the local node to process the AM reply message.

5. The method of any of the proceeding clauses, further comprising:

performing an RMA read under which data is read from the remote node and transferred to the local node by, sending an AM read request to the AM handler on the remote node, the AM read request identifying an address range in the remote address space of data to be read;

in response to receiving the AM read request message, retrieving the data to be read from the remote address space via the AM handler on the remote node and sending the retrieved data to the local node via an AM read reply message; and handling the AM read reply with an AM handler on the local node by extracting the data from the AM read reply and writing the data into a destination buffer on the local node.

6. The method of any of the proceeding clauses, further comprising:

performing an RMA read under which data is read from the remote node and transferred to the local node using a plurality of packets, wherein data for each of the plurality of packets is transferred by, sending a respective AM read request to the AM handler on the remote node, the AM read request identifying an address range in the remote address space of packet data to be read;

in response to receiving the AM read request message, retrieving the packet data to be read from the remote address space via the AM handler on the remote node and sending the retrieved packet data to the local node via an AM read reply message; and handling the AM read reply with an AM handler on the local node by extracting the packet data from the AM read reply and writing the packet data into a destination buffer on the local node.

7. The method of any of the proceeding clauses, further comprising:

employing a tagged message for the first AM write request using a tagged messaging scheme; and employing the AM handler on the remote node to inspect the tagged message to verify the remote node is the intended recipient of the first AM write request.

8. The method of any of the proceeding clauses, further comprising registering, at the local node, at least one address range in the remote memory address space on the remote node to which data may be written using one or more AM write requests sent from the remote node.

9. The method of clause 8, further comprising:

publishing an access key to the remote node corresponding to at least one address range registered with the local node;

including the access key in the first AM write request; and inspecting the access key via the AM handler on the remote node to validate whether the first AM write request is permitted.

10. A non-transient machine-readable medium having first and second sets of instructions stored thereon configured to be respectively executed on a local and remote node to implement the method of any of the proceeding clauses.

11. A method for performing Remote Memory Access (RMA) data transfers between a remote node and a local node, the method comprising:

performing an RMA write under which data is written from the local node to the remote node by, sending a first Active Message (AM) write request from the local node to an AM handler on the remote node, the first AM write request identifying an address range in a remote memory address space on the remote node at which the data is to be written;

reading data to be written from a source buffer on the local node and sending the data to the remote node;

processing the data that is received by the remote node to cause the data to be written into the remote memory address space to occupy the address range identified in the first AM write request.

12. The method of clause 11, further comprising:

receiving a plurality of AM write requests, each AM write request identifying an address range in the remote memory address space on the remote node at which a block of data associated with that AM write request that is to be subsequently sent is to be written, each AM write request including indicia identifying the block of associated data;

enqueuing, via the AM hander on the remote node, each AM write request in an RMA write queue on the remote node;

receiving a plurality of blocks of data from the local node, each block of data associated with a previously received AM write request and containing indicia from which the previously received AM write request can be identified;

dequeing the AM write requests from the RMA write queue; and processing each dequeued AM write request to determine where the received block of data associated with that AM write request is to be written in the remote memory address space.

13. The method of clause 11 or 12, further comprising performing an RMA read under which data is read from the remote node and transferred to the local node by, sending an AM read request to the AM handler on the remote node, the AM read request identifying an address range in the remote address space of data to be read;

in response to receiving the AM read request message, generating, via the AM handler on the remote node an RMA read request corresponding to the AM read request identifying the address range in the remote address space of data to be read;

processing the RMA read request on the remote node, resulting in the data to be read from the remote address space as defined by the address range in the RMA read request being retrieved from the remote address space and sent to the local node; and writing the retrieved data that is sent from the remote node into a destination buffer on the local node.

14. The method of clause 13, further comprising:

in response to receiving the AM read request message, generating and enqueuing, via the AM handler on the remote node, an RMA read request corresponding to the AM read request in an RMA read request queue on the remote node identifying the address range in the remote address space of data to be read;

dequeueing the RMA read request from the RMA read request queue; and retrieving the data to be read from the remote address space as defined by the address range in the RMA read request and sending the retrieved data to the local node.

15. The method of clause 14, wherein the dequeueing, data retrieval and sending operations are performed by an RMA read function on the remote node that is separate from the AM handler on the remote node.

16. The method of any of clauses 11-15, further comprising registering, at the local node, at least one address range in the remote memory address space on the remote node into which data may be written using one or more AM write requests sent from the remote node.

17. The method of clause 16, further comprising:

publishing an access key to the remote node corresponding to at least one address range registered with the local node;

including the access key in the first AM write request; and inspecting the access key via the AM handler on the remote node to validate whether the first AM write request is permitted.

18. A non-transient machine-readable medium having first and second sets of instructions stored thereon configured to be respectively executed on a local and remote node to implement the method of any of clauses 11-17.

19. An apparatus comprising:

a network interface;

memory, including a local memory address space;

a write request Active Message (AM) handler, configured to, receive, via the network interface, a first AM write request sent from a remote apparatus over a communication link coupled to the network interface, the first AM write request corresponding to a Remote Memory Access (RMA) write issued by the remote apparatus and containing first data to be written at a starting address in the local memory address space in the memory at which the data is to be written;

handle the first AM write request by extracting the data from the first AM write request and writing the data into an address range in the remote memory address space beginning at the starting address; and send an AM write reply to the remote apparatus indicating the data has been successfully written into the remote memory address space.

20. The apparatus of clause 19, further comprising:

an RMA write module configured to perform an AM write operation under which a second AM write request corresponding to an RMA write to a remote memory address space in memory on the remote apparatus is generated and sent to the remote apparatus, the second AM write request containing second data to be written at a starting address in the remote memory address space at which the data is to be written; and a write reply AM handler, configured to process an AM write reply sent from the remote apparatus upon successfully writing the second data into the remote memory address space.

21. The apparatus of clause 20, further comprising a source buffer, and wherein the RMA write module is further configured to:

partition third data to be written to the remote memory address space into a plurality of packets;

for each of the plurality of packets, reading packet data corresponding to that packet from the source buffer; and sending a respective AM write request to a write request AM handler on the remote apparatus containing the packet data and a respective starting address in the remote memory address space on the remote apparatus at which the packet data is to be written.

22. The apparatus of any of clauses 19-21, wherein the write request AM handler is further configured to:

receive a plurality of AM write requests from the remote apparatus, each of the plurality of AM write requests containing respective packet data corresponding to a remote write of third data that is partitioned into a plurality of packets and is to be written into the local memory address space at a respective starting address in the local memory address space;

extract the packet data for each of the plurality of AM write requests and write the packet data into the local memory address space beginning at the starting address identified by that AM write request;

detect that an entirety of the third data has been written into the local memory address space; and send an AM write reply to the remote apparatus indicating the third data has been successfully written into the local memory address space.

23. The apparatus of any of clauses 19-22, further comprising:

a destination buffer in the local memory;

a read reply AM handler; and an RMA read module configured to, generate and send an AM read request to a read request AM handler on the remote apparatus, the AM read request identifying an address range in the remote address space of data of the remote apparatus to be read;

in response to the AM read request, receiving, from the remote apparatus, an AM read reply containing the data read from the remote address space; and handle the AM read reply with the read reply AM handler by extracting the data from the AM read reply and writing the data into the destination buffer.

24. The apparatus of any of clauses 19-23, wherein the RMA read module is further configure to performing an RMA read under which data is read from the remote apparatus and transferred using a plurality of packets, wherein data for each of the plurality of packets is remotely read by, sending a respective AM read request to the AM read request handler on the remote apparatus, the AM read request identifying an address range in the remote address space of packet data to be read;

in response to each respective AM read request, receiving, from the remote apparatus, an AM read replay containing the packet data read from the remote address space; and handling the AM read reply with the read reply AM handler by extracting the packet data from the AM read reply and writing the packet data into the destination buffer.

25. The apparatus of any of clauses 19-24, further comprising:

a read request AM handler configured to, receive an AM read request from the remote apparatus identifying an address range in the local address space of data containing data to be read;

retrieve the data from the address range identified in the AM read request; and send an AM reply to the remote apparatus containing the data that is retrieved.

26. An apparatus comprising:

a network interface;

memory, including a local memory address space;

a write request Active Message (AM) handler, configured to, receive, via the network interface, a plurality of AM write requests sent from a remote apparatus over a communication link coupled to the network interface, each AM write request corresponding to a Remote Memory Access (RMA) write issued by the remote apparatus and containing respective data to be written into the local memory address space and a starting address at which a start of the respective data is to be written; and generate an RMA write request and enqueue the RMA write request in an RMA write queue; and an RMA progress module configured to:

receive a plurality of blocks of data from the remote apparatus, each block of data associated with a previously received AM write request and containing indicia from which a corresponding RMA write request can be identified;

dequeue the RMA write requests from the RMA write queue; and process each dequeued RMA write request to determine where the received block of data associated with that RMA write request is to be written in the local memory address space.

27. The apparatus of clause 26, further comprising:

a source buffer in the memory; and an RMA write module configured to, send an AM write request to the remote apparatus, the AM write request identifying an address range in a remote memory address space in memory on the remote apparatus into which the data is to be written;

reading the data to be written from the source buffer; and send the data to the remote apparatus, wherein the data is sent subsequent to sending the AM write request, and the data is sent along with indicia configured to be used to match the data that is sent to the AM write request.

28. The apparatus of clause 26 or 27, further comprising:

an RMA read request queue;

a read request AM handler configured to receive an AM read request from the remote apparatus identifying an address range in the local address space of data to be read;

in response to receiving the AM read request message, generate a corresponding an RMA read request identifying the address range in the local address space of data to be read; and enqueue the RMA read request in the RMA read request queue; and an RMA progress module configured to, dequeue the RMA read request from the RMA read request queue;

read data from the local address space as defined by the address range in the RMA read request; and send the data that is read to the remote apparatus.

29. The apparatus of clause 28, further comprising:

a destination buffer occupying a portion of the memory; and an RMA read module configured to, send an AM read request to the remote apparatus, the AM read request identifying an address range in a remote address space in memory on the remote apparatus to be read;

receive, from the remote apparatus, data that has been read from the remote address space; and write the received data into the destination buffer.

30. An non-transient machine readable medium having instructions stored thereon configured to be executed on a node including a network interface and memory including a local address space, the instructions including:

a write request Active Message (AM) handler, configured to, when executed, receive, via the network interface, a first AM write request sent from a remote apparatus over a communication link coupled to the network interface, the first AM write request corresponding to a Remote Memory Access (RMA) write issued by the remote apparatus and containing first data to be written at a starting address in the local memory address space in the memory at which the data is to be written;

handle the first AM write request by extracting the data from the first AM write request and writing the data into an address range in the remote memory address space beginning at the starting address; and send an AM write reply to the remote apparatus indicating the data has been successfully written into the remote memory address space.

31. The non-transient machine-readable medium of clause 30, further including instructions comprising:

an RMA write module configured to perform an AM write operation under which a second AM write request corresponding to an RMA write to a remote memory address space in memory on the remote apparatus is generated and sent to the remote apparatus, the second AM write request containing second data to be written at a starting address in the remote memory address space at which the data is to be written; and a write reply AM handler, configured to process an AM write reply sent from the remote apparatus upon successfully writing the second data into the remote memory address space.

32. The non-transient machine-readable medium of clause 31, wherein the node further comprises a source buffer, and wherein the RMA write module is further configured to:

partition third data to be written to the remote memory address space into a plurality of packets;

for each of the plurality of packets, reading packet data corresponding to that packet from the source buffer; and sending a respective AM write request to a write request AM handler on the remote apparatus containing the packet data and a respective starting address in the remote memory address space on the remote apparatus at which the packet data is to be written.

33. The non-transient machine-readable medium of any of clauses 30-32, wherein the write request AM handler is further configured to:

receive a plurality of AM write requests from the remote apparatus, each of the plurality of AM write requests containing respective packet data corresponding to a remote write of third data that is partitioned into a plurality of packets and is to be written into the local memory address space at a respective starting address in the local memory address space;

extract the packet data for each of the plurality of AM write requests and write the packet data into the local memory address space beginning at the starting address identified by that AM write request;

detect that an entirety of the third data has been written into the local memory address space; and send an AM write reply to the remote apparatus indicating the third data has been successfully written into the local memory address space.

34. The non-transient machine-readable medium of any of clauses 30-33, wherein the node further comprises a destination buffer in the local memory, and the instructions further comprise:

a read reply AM handler; and an RMA read module configured to, upon execution, generate and send an AM read request to a read request AM handler on the remote apparatus, the AM read request identifying an address range in the remote address space of data of the remote apparatus to be read;

in response to the AM read request, receiving, from the remote apparatus, an AM read reply containing the data read from the remote address space; and handle the AM read reply with the read reply AM handler by extracting the data from the AM read reply and writing the data into the destination buffer.

35. The non-transient machine-readable medium of any of clauses 30-34, wherein the RMA read module is further configure to performing an RMA read under which data is read from the remote apparatus and transferred using a plurality of packets, wherein data for each of the plurality of packets is remotely read by, sending a respective AM read request to the AM read request handler on the remote apparatus, the AM read request identifying an address range in the remote address space of packet data to be read;

in response to each respective AM read request, receiving, from the remote apparatus, an AM read replay containing the packet data read from the remote address space; and handling the AM read reply with the read reply AM handler by extracting the packet data from the AM read reply and writing the packet data into the destination buffer.

36. The non-transient machine-readable medium of any of clauses 30-35, wherein the instructions further comprise:

a read request AM handler configured to, receive an AM read request from the remote apparatus identifying an address range in the local address space of data containing data to be read;

retrieve the data from the address range identified in the AM read request; and send an AM reply to the remote apparatus containing the data that is retrieved.

37. An non-transient machine readable medium having instructions stored thereon configured to be executed on a node including a network interface and memory including a local address space, the instructions including:

a write request Active Message (AM) handler, configured to, upon execution, receive, via the network interface, a plurality of AM write requests sent from a remote apparatus over a communication link coupled to the network interface, each AM write request corresponding to a Remote Memory Access (RMA) write issued by the remote apparatus and containing respective data to be written into the local memory address space and a starting address at which a start of the respective data is to be written; and generate an RMA write request and enqueue the RMA write request in an RMA write queue; and an RMA progress module configured to, upon execution, receive a plurality of blocks of data from the remote apparatus, each block of data associated with a previously received AM write request and containing indicia from which a corresponding RMA write request can be identified;

dequeue the RMA write requests from the RMA write queue; and process each dequeued RMA write request to determine where the received block of data associated with that RMA write request is to be written in the local memory address space.

38. The non-transient machine-readable medium of clause 37, wherein the node further comprises further a source buffer in the memory, and wherein the instructions further comprise:

an RMA write module configured to, upon execution, send an AM write request to the remote apparatus, the AM write request identifying an address range in a remote memory address space in memory on the remote apparatus into which the data is to be written;

reading the data to be written from the source buffer; and send the data to the remote apparatus, wherein the data is sent subsequent to sending the AM write request, and the data is sent along with indicia configured to be used to match the data that is sent to the AM write request.

39. The non-transient machine-readable medium of clause 37 or 38, wherein the node further comprises an RMA read request queue, and wherein the instructions further comprise:

a read request AM handler configured to, upon execution, receive an AM read request from the remote apparatus identifying an address range in the local address space of data to be read;

in response to receiving the AM read request message, generate a corresponding an RMA read request identifying the address range in the local address space of data to be read; and enqueue the RMA read request in the RMA read request queue; and an RMA progress module configured to, dequeue the RMA read request from the RMA read request queue;

read data from the local address space as defined by the address range in the RMA read request; and send the data that is read to the remote apparatus.

40. The non-transient machine-readable medium of clause 39, wherein the node further comprises a destination buffer occupying a portion of the memory, and wherein the instructions further comprise:

an RMA read module configured to, upon execution, send an AM read request to the remote apparatus, the AM read request identifying an address range in a remote address space in memory on the remote apparatus to be read;

receive, from the remote apparatus, data that has been read from the remote address space; and write the received data into the destination buffer.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or embedded components and applications, such as software running on a server or device processor or software and/or firmware executed by an embedded processor or the like. Thus, embodiments of this invention may be used as or to support a software program, software modules, firmware, and/or distributed software executed upon some form of processing core (such as the CPU of a computer, one or more cores of a multi-core processor), a virtual machine running on a processor or core or otherwise implemented or realized upon or within a computer-readable or machine-readable non-transitory storage medium. A computer-readable or machine-readable non-transitory storage medium includes any mechanism for storing or transmitting information in a form readable by a machine (e.g., a computer). For example, a computer-readable or machine-readable non-transitory storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer-readable or machine-readable non-transitory storage medium may also include a storage or database from which content can be downloaded. The computer-readable or machine-readable non-transitory storage medium may also include a device or product having content stored thereon at a time of sale or delivery. Thus, delivering a device with stored content, or offering content for download over a communication medium may be understood as providing an article of manufacture comprising a computer-readable or machine-readable non-transitory storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including computer-readable or machine-readable non-transitory storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for performing Remote Memory Access (RMA) data transfers between a remote node and a local node, the method comprising:
    performing an RMA write under which data is written from the local node to the remote node by,
        reading data to be written from a source buffer on the local node;
        sending a first Active Message (AM) write request from the local node to an AM handler on the remote node, the first AM write request containing data to be written and a starting address in a remote memory address space on the remote node at which the data is to be written;
        handling the first AM write request with the AM handler on the remote node by extracting the data from the first AM write request and writing the data into an address range in the remote memory address space beginning at the starting address,
        sending an AM write reply from the remote to the local node, the AM write reply indicating the data has been successfully written into the remote memory address space; and
        employing an AM handler on the local node to process the AM write reply message.

2. The method of claim 1, further comprising:
    partitioning the data to be written into a plurality of packets;
    for each of the plurality of packets,
        reading packet data corresponding to that packet from the source buffer on the local node;
        sending a respective AM request from the local node to the AM handler on the remote node containing the packet data and a starting address in a remote memory address space on the remote node at which the packet data is to be written; and
        handling the respective AM request with the AM handler on the remote node by extracting the packet data from the respective AM request and writing the data into an address range in the remote memory address space beginning at the starting address,
    wherein the first AM write request corresponds to an AM write request used to transfer a first packet of data of the plurality of packets.

3. The method of claim 2, further comprising:
    detecting that all of the packet data has been successfully written to the remote memory address space;
    sending an AM reply from the remote to the local node indicating the packet data has been successfully written into the remote memory address space; and
    employing an AM handler on the local node to process the AM reply message.

4. The method of claim 1, further comprising:
    performing an RMA read under which data is read from the remote node and transferred to the local node by,
        sending an AM read request to the AM handler on the remote node, the AM read request identifying an address range in the remote address space of data to be read;
        in response to receiving the AM read request message, retrieving the data to be read from the remote address space via the AM handler on the remote node and sending the retrieved data to the local node via an AM read reply message; and
        handling the AM read reply with an AM handler on the local node by extracting the data from the AM read reply and writing the data into a destination buffer on the local node.

5. The method of claim 1, further comprising:
    performing an RMA read under which data is read from the remote node and transferred to the local node using a plurality of packets, wherein data for each of the plurality of packets is transferred by,
        sending a respective AM read request to the AM handler on the remote node, the AM read request identifying an address range in the remote address space of packet data to be read;
        in response to receiving the AM read request message, retrieving the packet data to be read from the remote address space via the AM handler on the remote node and sending the retrieved packet data to the local node via an AM read reply message; and
        handling the AM read reply with an AM handler on the local node by extracting the packet data from the AM read reply and writing the packet data into a destination buffer on the local node.

6. The method of claim 1, further comprising:
    employing a tagged message for the first AM write request using a tagged messaging scheme; and
    employing the AM handler on the remote node to inspect the tagged message to verify the remote node is the intended recipient of the first AM write request.

7. The method of claim 1, further comprising:
    registering, at the local node, at least one address range in the remote memory address space on the remote node into which data may be written using one or more AM write requests sent from the remote node;
    publishing an access key to the remote node corresponding to at least one address range registered with the local node;
    including the access key in the first AM write request; and inspecting the access key via the AM handler on the remote node to validate whether the first AM write request is permitted.

8. A method for performing Remote Memory Access (RMA) data transfers between a remote node and a local node, the method comprising:
performing an RMA write under which data is written from the local node to the remote node by,
sending a first Active Message (AM) write request from the local node to an AM handler on the remote node, the first AM write request identifying an address range in a remote memory address space on the remote node at which the data is to be written;
reading data to be written from a source buffer on the local node and sending the data to the remote node;
processing the data that is received by the remote node to cause the data to be written into the remote memory address space to occupy the address range identified in the first AM write request,
receiving a plurality of AM write requests, each AM write request identifying an address range in the remote memory address space on the remote node at which a block of data associated with that AM write request that is to be subsequently sent is to be written, each AM write request including indicia identifying the block of associated data;
enqueuing, via the AM hander on the remote node, each AM write request in an RMA write queue on the remote node;
receiving a plurality of blocks of data from the local node, each block of data associated with a previously received AM write request and containing indicia from which the previously received AM write request can be identified;
dequeing the AM write requests from the RMA write queue; and
processing each dequeued AM write request to determine where the received block of data associated with that AM write request is to be written in the remote memory address space.

9. The method of claim 8, further comprising performing an RMA read under which data is read from the remote node and transferred to the local node by,
sending an AM read request to the AM handler on the remote node, the AM read request identifying an address range in the remote address space of data to be read;
in response to receiving the AM read request message, generating, via the AM handler on the remote node an RMA read request corresponding to the AM read request identifying the address range in the remote address space of data to be read;
processing the RMA read request on the remote node, resulting in the data to be read from the remote address space as defined by the address range in the RMA read request being retrieved from the remote address space and sent to the local node; and
writing the retrieved data that is sent from the remote node into a destination buffer on the local node.

10. The method of claim 9, further comprising:
in response to receiving the AM read request message, generating and enqueuing, via the AM handler on the remote node, an RMA read request corresponding to the AM read request in an RMA read request queue on the remote node identifying the address range in the remote address space of data to be read;

dequeueing the RMA read request from the RMA read request queue; and
retrieving the data to be read from the remote address space as defined by the address range in the RMA read request and sending the retrieved data to the local node.

11. The method of claim 10, wherein the dequeueing, data retrieval and sending operations are performed by an RMA read function on the remote node that is separate from the AM handler on the remote node.

12. The method of claim 8, further comprising registering, with the local node, at least one address range in the remote memory address space on the remote node into which data may be written using one or more AM write requests sent from the local node.

13. An apparatus comprising:
a network interface;
memory, including a local memory address space;
a write request Active Message (AM) handler, configured to,
receive, via the network interface, a first AM write request sent from a remote apparatus over a communication link coupled to the network interface, the first AM write request corresponding to a Remote Memory Access (RMA) write issued by the remote apparatus and containing first data to be written at a starting address in the local memory address space in the memory at which the data is to be written;
handle the first AM write request by extracting the data from the first AM write request and writing the data into an address range in the remote memory address space beginning at the starting address; and
send an AM write reply to the remote apparatus indicating the data has been successfully written into the remote memory address space.

14. The apparatus of claim 13, further comprising:
an RMA write module configured to perform an AM write operation under which a second AM write request corresponding to an RMA write to a remote memory address space in memory on the remote apparatus is generated and sent to the remote apparatus, the second AM write request containing second data to be written at a starting address in the remote memory address space at which the data is to be written; and
a write reply AM handler, configured to process an AM write reply sent from the remote apparatus upon successfully writing the second data into the remote memory address space.

15. The apparatus of claim 14, further comprising a source buffer, and wherein the RMA write module is further configured to:
partition third data to be written to the remote memory address space into a plurality of packets;
for each of the plurality of packets,
reading packet data corresponding to that packet from the source buffer; and
sending a respective AM write request to a write request AM handler on the remote apparatus containing the packet data and a respective starting address in the remote memory address space on the remote apparatus at which the packet data is to be written.

16. The apparatus of claim 13, wherein the write request AM handler is further configured to:
receive a plurality of AM write requests from the remote apparatus, each of the plurality of AM write requests containing respective packet data corresponding to a remote write of third data that is partitioned into a plurality of packets and is to be written into the local memory address space at a respective starting address in the local memory address space;

extract the packet data for each of the plurality of AM write requests and write the packet data into the local memory address space beginning at the starting address identified by that AM write request;

detect that an entirety of the third data has been written into the local memory address space; and send an AM write reply to the remote apparatus indicating the third data has been successfully written into the local memory address space.

17. The apparatus of claim 13, further comprising:
a destination buffer in the local memory;
a read reply AM handler; and
an RMA read module configured to:
   generate and send an AM read request to a read request AM handler on the remote apparatus, the AM read request identifying an address range in the remote address space of data of the remote apparatus to be read;
   in response to the AM read request, receiving, from the remote apparatus, an AM read reply containing the data read from the remote address space; and
   handle the AM read reply with the read reply AM handler by extracting the data from the AM read reply and writing the data into the destination buffer.

18. The apparatus of claim 17, wherein the RMA read module is further configure to performing an RMA read under which data is read from the remote apparatus and transferred using a plurality of packets, wherein data for each of the plurality of packets is remotely read by,
   sending a respective AM read request to the AM read request handler on the remote apparatus, the AM read request identifying an address range in the remote address space of packet data to be read;
   in response to each respective AM read request, receiving, from the remote apparatus, an AM read replay containing the packet data read from the remote address space; and
   handling the AM read reply with the read reply AM handler by extracting the packet data from the AM read reply and writing the packet data into the destination buffer.

19. The apparatus of claim 13, further comprising:
a read request AM handler configured to:
   receive an AM read request from the remote apparatus identifying an address range in the local address space of data containing data to be read;
   retrieve the data from the address range identified in the AM read request; and
   send an AM reply to the remote apparatus containing the data that is retrieved.

20. An apparatus comprising:
a network interface;
memory, including a local memory address space;
a write request Active Message (AM) handler, configured to,
   receive, via the network interface, a plurality of AM write requests sent from a remote apparatus over a communication link coupled to the network interface, each AM write request corresponding to a Remote Memory Access (RMA) write issued by the remote apparatus and containing respective data to be written into the local memory address space and a starting address at which a start of the respective data is to be written; and
   generate an RMA write request and enqueue the RMA write request in an RMA write queue; and
an RMA progress module configured to:
receive a plurality of blocks of data from the remote apparatus, each block of data associated with a previously received AM write request and containing indicia from which a corresponding RMA write request can be identified;
dequeue the RMA write requests from the RMA write queue; and
process each dequeued RMA write request to determine where the received block of data associated with that RMA write request is to be written in the local memory address space.

21. The apparatus of claim 20, further comprising:
a source buffer in the memory; and
an RMA write module configured to,
send an AM write request to the remote apparatus, the AM write request identifying an address range in a remote memory address space in memory on the remote apparatus into which the data is to be written;
reading the data to be written from the source buffer; and
send the data to the remote apparatus, wherein the data is sent subsequent to sending the AM write request, and the data is sent along with indicia configured to be used to match the data that is sent to the AM write request.

22. The apparatus of claim 20, further comprising:
an RMA read request queue;
a read request AM handler configured to
   receive an AM read request from the remote apparatus identifying an address range in the local address space of data to be read;
   in response to receiving the AM read request message, generate a corresponding an RMA read request identifying the address range in the local address space of data to be read; and
   enqueue the RMA read request in the RMA read request queue; and
an RMA progress module configured to,
   dequeue the RMA read request from the RMA read request queue;
   read data from the local address space as defined by the address range in the RMA read request; and
   send the data that is read to the remote apparatus.

23. The apparatus of claim 22, further comprising:
a destination buffer occupying a portion of the memory; and
an RMA read module configured to,
   send an AM read request to the remote apparatus, the AM read request identifying an address range in a remote address space in memory on the remote apparatus to be read;
   receive, from the remote apparatus, data that has been read from the remote address space; and
   write the received data into the destination buffer.

* * * * *